Nov. 13, 1962     F. G. LAMB     3,063,252

UPRIGHT REFRIGERATOR SHOWCASE

Filed Aug. 17, 1961     8 Sheets-Sheet 1

INVENTOR
*Frank G. Lamb*

BY *Thomas, Weisman & Russell*
ATTORNEYS

Fig. 2.

Nov. 13, 1962  F. G. LAMB  3,063,252
UPRIGHT REFRIGERATOR SHOWCASE
Filed Aug. 17, 1961  8 Sheets-Sheet 3

INVENTOR
Frank G. Lamb

BY Thomas, Weisman & Russell
ATTORNEYS

Nov. 13, 1962 F. G. LAMB 3,063,252
UPRIGHT REFRIGERATOR SHOWCASE
Filed Aug. 17, 1961 8 Sheets-Sheet 8

INVENTOR
Frank G. Lamb
BY
Thomas, Weisman & Russell
ATTORNEYS

# 3,063,252
UPRIGHT REFRIGERATOR SHOWCASE
Frank Gilbert Lamb, American Falls, Idaho
(77 Iron Mountain Blvd., Lake Oswego, Oreg.)
Filed Aug. 17, 1961, Ser. No. 135,694
25 Claims. (Cl. 62—234)

This invention is directed to a means and method of refrigerating an open front type of frozen food showcase for the display and dispensing of refrigerated packages while maintaining the same at a predetermined, low temperature. This application is a continuation-in-part application of my co-pending application, Serial No. 789,651, filed January 28, 1959 for Upright Refrigerator Showcase, now abandoned.

In more particular, the invention involves a showcase of the upright type wherein the packaged frozen items are placed upon suitable display shelves, the front of the unit being open for inspection and easy access by the customer. By utilizing the means and method of this invention, maintenance of temperatures well below 0° F. within the interior of the cabinet can be accomplished with ease, even though the front of the unit is open to room air at normal temperature. Such function is achieved primarily through the employment of a multiple layer, or adjacent curtains of refrigerated air which not only encircle the cabinet as a novel insulation media but also progress downwardly at approximately the same velocity from the top of the open front to the bottom thereof, to act as a protective curtain against, warmer, room air. Also, the concept of downwardly directing cool air from the cold air ducts within each shelf, to be in each case recycled or recooled and returned to the original frontal point of discharge, is in and of itself, a novel design for interior cooling of the cabinet.

This novel principle and method of operation involves a concept which sharply distinguishes this type of unit from those commonly in use today or those known to the prior art. Cabinets designed for analogous purposes which are presently in use are generally of a box-like structure having four upright side walls and an open top. In such type of device, the frozen packages are stacked upon each other within the box and the problem of maintenance of an even temperature uniformly within such a unit is ever present. In part, this is because the topmost layer of packages, being adjacent to the warmer room air, and being exposed to radiant heat as well, tend to be heated to a temperature above that point which is necessary for the proper preservation of frozen foods and like articles, only the lower-most of the articles being properly refrigerated. It is recognized that frozen foods must be kept at a temperature of approximately 0° F. and that temperatures of a higher order result in food deterioration. Hence, in the open top type of unit, unless customer demand is sufficient to continually have the top layers of packages removed before temperature increase occurs, there is the ever present danger of spoilage of the product.

Furthermore, in this type of unit, as opposed to the shelf-like structure of the instant invention, the packages are stacked on upon the other, the nature of the units being such that only limited display area is afforded, considering the area of floor space such cabinets require. The cabinet of the instant invention has two to three times as much display area while at the same time the vertical disposition thereof is far more appealing and effective. Also, this improved cabinet has four to five times the storage area, for a given floor space, than do existing cabinets. It is also to be noted that although efforts have been made to maintain circulation of refrigerated air, and to prevent frosting, in the open top type of structure, these have met with no marked success because of the contact necessarily resulting between the upper layer of relatively cool air in such type of cabinet and the warmer atmosphere of the room.

Additionally referring to the open top type of cabinet of the prior art, it is also important to observe that such cannot, by its very nature, function to take advantage of the multiple layer of cold air principle. This is because in such a cabinet, air flow must be lateral, rather than vertical, and hence not subject to the benefit of pure gravity flow. In contrast, the instant design, formulated to achieve vertical flow of cool air in layers with a minimum of turbulence, utilizes advantageously the natural gravity flow of such cold air to create and maintain the protective curtain.

In the instant invention, a multiple refrigerated air layer or series of layers provides an effective curtain of cold air which excludes air at room temperature from the interior of the cabinet and which at the same time provides, in a sense, an effective insulation between exterior and interior of the showcase. With the application of the multiple air principle or falling curtain of air concept, this design permits achieving the primary objective of the invention: display of foods in a showcase type of cabinet having an open front for a series of shelves where the product is clearly positioned for inspection by and within easy reach of the customer; the peculiarities of the instant combination at the same time remove all danger of temperature increase within the cabinet to that degree which might result in food spoilage.

Another object of this invention is to provide a cabinet of the open front type wherein there is a constant circuit of air continually driven around the exterior of the cabinet in multiple layers, and down the open front of the cabinet in multiple layers, so that frozen foods placed upon the series of interiorly cooled shelves within the unit are curtained from air at room temperature and thus efficiently maintained at temperatures sufficiently low to offer complete assurance against food spoilage.

A further object of the invention is to provide an open front showcase of the described type wherein the multiple layers of refrigerated air progressing downwardly over the open front create a minimum of turbulence, and, being directed downwardly are immediately recycled from their lowermost point to the refrigerating mechanism for further progress around both exterior and interior of the cabinet and thence again down over the front opening. Also, by the particular arrangement of this invention, and particularly with respect to the interior recycling of the coldest air, each of the multiple streams of such coldest air protects the product for only a few inches of fall and then another stream of coldest air is injected which protects the product with coldest air for another few inches of fall, and so on. Such novel concept affords complete and uniform cooling throughout the interior of the cabinet.

An additional objective of the invention is a structure of the described type wherein the cabinet is encircled by layers, toward the exterior thereof, of progressively warmer air, a part of which is continuously returned for recycling over the cooling coils to maintain the same, constant temperature of each individual layer. Also by contact with the relatively cool exterior of the cabinet proper, these multiple layers of cool air provide effective insulation between the interior and exterior of the cabinet. By this procedure, the temperatures of the different layers do not differ greatly in any one layer in any one complete circuit.

Another significant objective of the invention is the provision, in a unit of the described type, of frost catching coils or dehumidifying apparatus at the point of entry of the warmed layers of air to remove the moisture therefrom prior to admission to the cooling apparatus; such mechanism and function prevents frosting within the interior of the cabinet, and hence, frosting of the frozen food packages themselves. Furthermore, such defrosting sysem is provided with effective thermal insulation protecting it from the rest of the refrigerating system. Such permits continuous and uninterrupted delivery of cold air to the displayed product during the refrigeration cycle.

Another object of the invention is to provide an open front type of display cabinet wherein the shelves themselves perform as cold air carrying ducts, each being individually cooled to reduce the temperature of the packages by conduction, and each also functioning as cold air ducts, releasing or discharging the cooled air downwardly to join the multiple air curtain of falling, cooled air which is discharged from the layered passageways surrounding the unit. In this respect the cold air circulating within the cabinet, involving passage of cold air through each of the shelves to be discharged downwardly to meet the cold air streams of the lower shelves, itself provides a novel and effective concept of cabinet refrigeration.

A further objective of the invention is the provision of a unit which can be built in predetermined sections or lengths, such being adapted to be readily interconnected to each other to obtain an over-all showcase width of the desired footage. In other words, the unit can be fabricated at the factory with omission of one insulated side wall from either the right or left side, and alternatively, with omission of both insulated side walls for interior units, and then the whole assembled to form a long attractive line giving an outward appearance of one continuous unit. Furthermore, the cabinet is inherently of the type to display the product, not the cabinet, the latter being of simpler construction than previous types, and hence cheaper to manufacture.

As a final summary of the many advantages to be realized by the instant invention, the following, inter alia, are mentioned: maximum storage and display area with minimum use of floor space; recovery of a substantial portion of the multiple air curtain which is colder than room air and would ordinarily not otherwise re-enter the recycling mechanism; the utilization of thermal losses through conventional insulation which otherwise would be lost to the room, but which in this instance decrease the temperature of the protective air streams around the unit and thus increase the over-all effectiveness of the assembly in obtaining and maintaining low temperatures of the desired gradient; the protection afforded the customer from the intense cold of the cabinet shelves and cold air discharged through the external multiple layers by picking up the descending multiple layers of refrigerated air at floor level and returning same to the unit; and not only reducing or substantially eliminating the mixing of room air with refrigerated air which flows over the packaged items but preventing humid room air from coming into contact with both shelves and packages. As to the latter, admission of room air to the unit would result in heavy condensation and frosting on the below zero temperature of frozen food items. Hence, a primary function of the instant design is to permit only dry and dehumidified air to enter the cold air circulation systems arranged within and about the cabinet and into the various recycling ducts which these involve, thus affording complete assurance that neither the duct-work nor the package contacting portions of the assembly accumulate frost to any perceptible degree.

Other objects and advantages of this invention will be apparent upon consideration of the following more particular description of this invention as illustrated in the several drawings thereof wherein.

Figure 1:
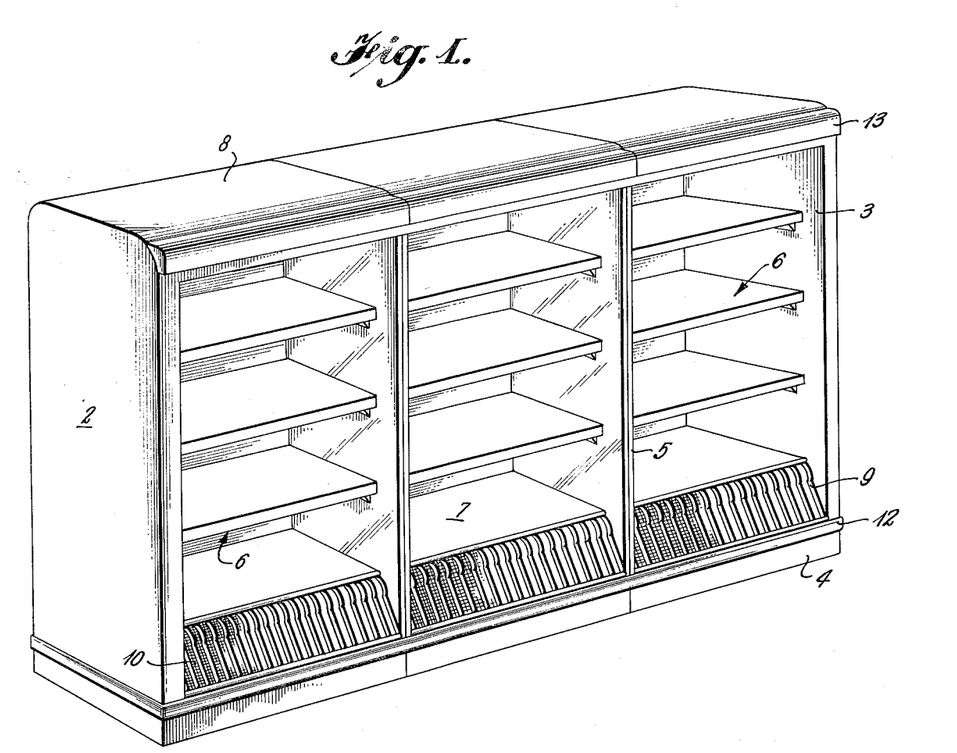
FIGURE 1 is a perspective view of three prefabricated sections of one embodiment of the invention joined together to form a completed unit of predetermined overall length.

Referring more particularly to these several figures, it will be seen that FIGURE 1 is representative of the exterior and finished appearance of the cabinet indicating that the front is open and that the series of frozen food supporting shelves, horizontally disposed, are positioned for inspection and convenient access by the customer. Here also is shown an arrangement where, as an example, three separate units are placed together to function as a single display cabinet of the desired length. In the preferred embodiments of the invention, each section may approximate five foot in over-all length and accordingly the unit herein represented in this figure is fifteen feet in length. As further representative of the comparative size of this pictured installation, the depth of the unit approximates three and one-half feet, and the height, six and one-half feet.

Figure 5:
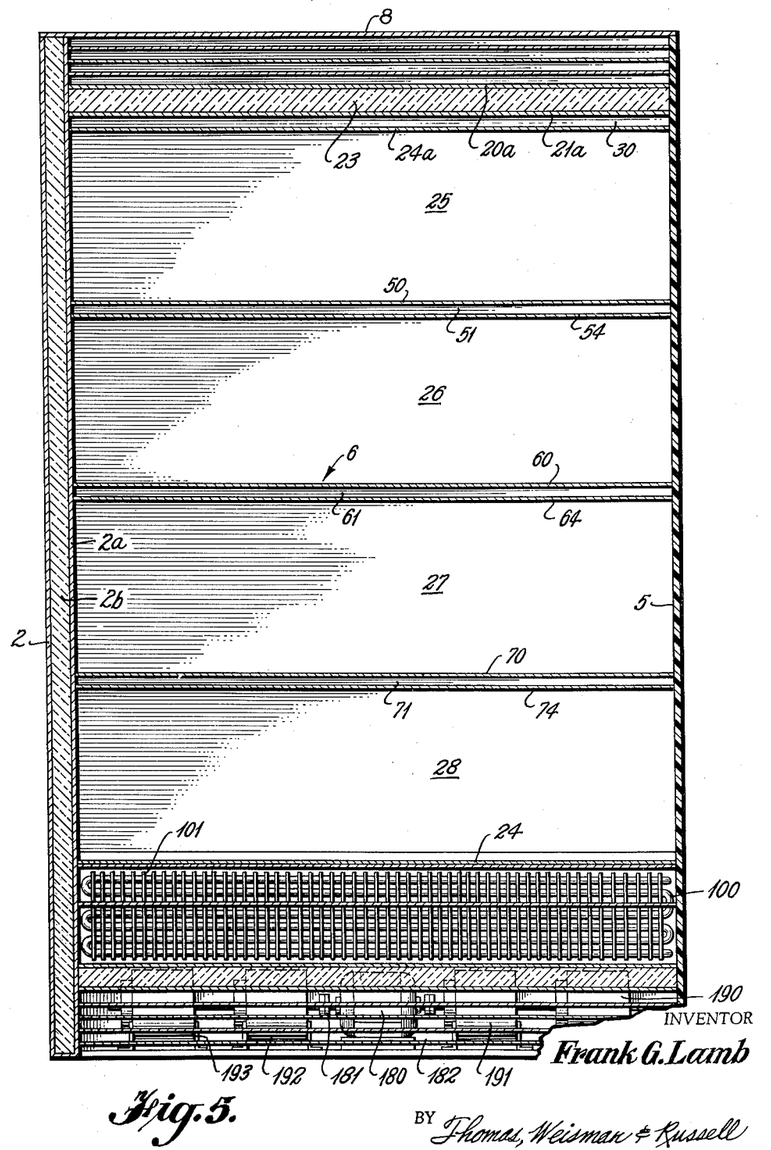
FIGURE 5 is a section view taken on the line 5—5 of FIGURE 2.

Each of the units is provided with an upright back 1 of suitable material, the same at its top portion being curved laterally or positioned to the horizontal to form a top 8. Actually this back and top form the outside of a series of cold air passageways, as will be later explained.

Where several units are placed together such as shown in FIGURES 1 and 5, insulated side walls 2 and 3 are affixed to the outer sides of these two outer units. Thus, each of the side walls 2 and 3 would be provided with a double wall construction, inclusive of the inner wall 2a, and also provided with insulation 2b therebetween. The three illustrated units comprising one installation are mounted above a common base board 4. Each unit is separated from its adjacent unit by its own side wall 5 so that when several are placed together these side walls contact each other and, being made of heat conductive metal, also become cooled during operation of the showcase and, by conduction, lower the temperature of any contacting packages. Actually, the intermediate side walls are not only additional supporting means, but further function to reduce room air turbulence upon the protective air curtain and optionally may be fabricated of glass or clear plastic to aid in inspection of the interior.

A series of shelves are generally indicated at 6. As will be described hereinafter, each of these shelves is individually cooled by the passage of refrigerated air through the interior of the shelf. Each unit is also provided with a bottom plate 7 which overlies the refrigerating system as well as the two cold air cycling and recycling mechanisms. It is also preferred that the shelf 7 be removably placed over the cooling mechanism in order that the latter can be easily serviced, and it is so shown in FIGURE 2 herein.

Figure 2:
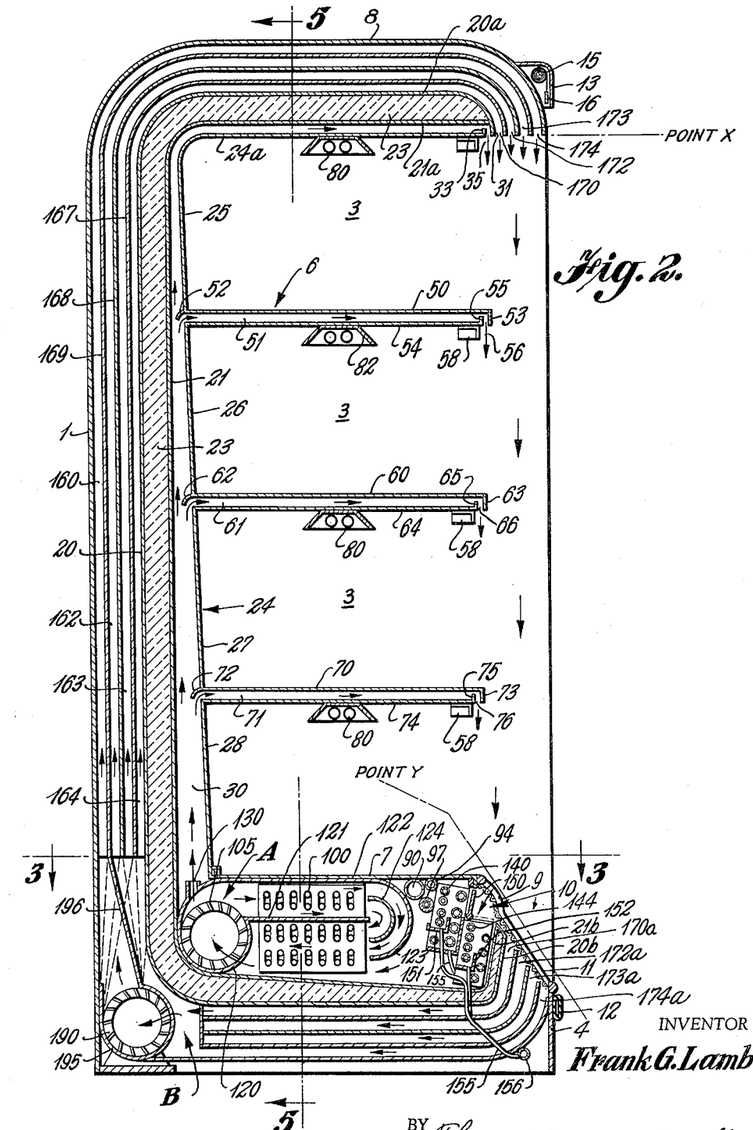
FIGURE 2 is a section view of the invention as shown in FIGURE 1 illustrating the circulatory paths of the two multiple layers of refrigerated air and the manner by which cycling and recycling of each are accomplished.

Underneath and in the front of the bottom shelf 7 is disposed a series of lateral openings or slots (to be later described) for the entrance of air descending in a multiple layer down the front of the unit. A single main inlet for the coldest air descending from each of the several shelves or trays is generally indicated at 10 (FIGURE 2). Such entrances are covered with suitable screening 11 which, if desired, may be backed by a thickness of filter for obvious purposes. The screening itself is protected by a series of angularly positioned chrome rods 9. A guard rail or bumper 12, as is usual in such instances, surrounds the sides and front of each cabinet at the top of the base board 4.

Provision is made for closing off access through the front of each unit by means of a shade 16 which is positioned underneath a suitable canopy 13 extending across the front and along the uper edge of the unit. A roller 15 of usual type supports this shade 16 so that at the end of the day the shade may be lowered to a position over the referred to bumper 12, thus completely preventing intermixture of air at room temperature with air within the cabinet when the unit is not in use during off hours.

In the preferred embodiment of this invention, there is provided one main refrigeration or cooling system, a dehumidifying assembly, and two primary circulatory systems for cycling and recycling the cooled air within and around the basic unit, respectively. These two circulatory systems for the cold air are generally indicated at A and B. (See FIGURES 2 and 6.)

System A is located within the interior of the cabinet, i.e., within the main framework thereof and on the inside of the composition insulation which is positioned, as is common, within a suitable double wall. The circulatory system B, on the other hand, is adapted to circulate the refrigerated air around the exterior of the cabinet or upon the outside of the main insulation casing just referred to and accomplishes this function by circulation through a series of adjacent channels or passageways, discharging the cooled air in metered layers down the open front of the cabinet. The refrigerating apparatus and circulatory system A will be referred to firstly herein.

As indicated, permanent insulation for the cabinet is found within the double walls 20 and 21, forming the main insulation casing which extend throughout the entire back of the unit and around the bottom and top respectively. Thus the outer wall 20 progresses upwardly, thence right angularly to a horizontal position forming a top portion 20a as shown in FIGURE 2. The insulation wall 20 at its lower portion is bent right angularly toward the front and then upwardly as indicated at 20b in FIGURE 2. The inner wall 21 closely follows, in parallel relationship, the contour of the outer wall 20, likewise extending horizontally at the top, as at 21a, and, at the bottom, being somewhat inclined downwardly and then upwardly as at 21b, as also shown in this figure. Insulation 23, of a usual type occupies the space between this double wall framework. It is here to be noted that such conventional insulation up the back wall as well as top may be only from two to three inches in thickness, or of relatively extreme thinness. This is due to the inherent advantage found in the structure of the instant invention, which provides for a multiple layer of cool air, graduated in temperature from inside out, that encircles the bottom, back and top of the cabinet and shields the open front as well.

A third inner wall, generally indicated at 24, provides a duct 30 through which refrigerated air passes upwardly and is forced into the the space provided in each shelf, ultimately being discharged downwardly in a manner to be described. The inner wall 24 of this duct is spaced at a greater distance from the wall 21 at the bottom thereof than at its top portion as indicated in FIGURE 2, the reason for this being to offer as little resistance as possible to the air forced through duct 30 by an appropriate blower mechanism. The wall 24 is also turned right angularly as at 24a, the latter extension being parallel to the horizontal portion of the wall 21 and hence, the duct 30 continues forwardly along the top of the interior of the cabinet. The wall 21 and the outer wall 20 are interconnected at their upper extremities as shown in FIGURE 2 with the wall 20a continuing past the point of intersection, and in conjunction with a lip 33 formed upon the wall 24a, forming an air passageway 35 which is directed downwardly and comprises one of the downwardly disposed coldest air discharge ducts.

Actually, the inside wall 24 of the duct 30 is segmented, i.e., formed of individual spaced elements or walls 25, 26, 27 and 28, the space therebetween comprising slots forming the openings into the cold air ducts within each of the shelves, as will be described. These walls thus form the back of the interior of the unit, the cold and dry air within the duct 30 cooling the rear portion of each shelf by conduction through such rear shelf walls.

In this embodiment of the invention, the main duct 30 for the coldest air just leaving the refrigeration unit is interconnected to a series, here three in number, of laterally disposed ducts which at the same time function as the shelves 6 hereinbefore but generally referred to. Thus, beginning at the top of the structure shown in FIGURE 2, it is seen that the first shelf is comprised of two parallel and opposed sheet metal plates 50 and 54, thereby leaving a passageway 51 for the flow of cold air through the shelf to its point of discharge, or passageway 56. The rear of the shelf terminates in a downwardly turned flange 52 which extends past the inner wall 24 of the duct 30 and hence, constitutes a scoop or baffle against which the flow of refrigerated air impinges. Obviously the scoop causes a portion of such cold air to enter into the passageway 51. The lower plate 54 of the shelf terminates in an upwardly extending flange 55 and the upper plate 50 of the shelf terminates in a downwardly extending flange 53. These two flanges form the duct or passageway 56 directing the flow of cold air downwardly. This top shelf is supported in any customary manner as by a transverse angle iron support 58 at the forward end of the shelf. At its rear any suitable means can be utilized for connection of the shelf to the inner walls 25 and 26 of the cold air duct 30, such walls, as stated, being spaced to form a slot or opening to accommodate passage of the air from the duct 30 into, e.g., the duct 51 within the shelf.

The other two shelves as shown in FIGURE 2 are of like construction. The intermediate shelf is comprised of two opposed sheet metal plates 60 and 64 thereby forming a cold air passageway 61, each plate terminating in parallel flanges 63 and 65 to form a downwardly directed discharge opening 66. Similarly, the upper plate 60 of this intermediate shelf has the same form of scoop construction 62 for the same purpose as herein described and is affixed to the spaced inner walls 26 and 27 in the same manner. It is likewise supported at its forward end by the angle iron brace 68.

The bottom shelf is of like construction with the two plates 70 and 74 forming a cold air channel 71, the upper plate at its inner end turned downwardly to form a scoop 72 and both plates at their forward ends having parallel flanges 74 and 75 providing the channel 76 which directs cold air downwardly. The bottom shelf is supported in the same manner through the transverse brace 58.

A usual type of lighting fixture such as the fluorescent fixture 80 is provided underneath the top and underneath each of the described shelves, all of such fixtures having a common form of shade 82 thereover.

As stated, the main refrigeration unit is located under the bottom 7. It is of a common and known type, the cooling coils thereof traversing substantially the width of each of the units as will be seen by reference to FIGURE 5.

Since common to the prior art, the details of the refrigeration mechanism are not here disclosed, the compressor, motor and related components thereof comprising assembles well known in the art. Hence, such component parts thereof as the suction line 90, the liquid line 94 and the insulated hot gas line 97 (here used for defrosting) are but more or less diagrammatically indicated in FIGURE 2.

The refrigeration coils 100, having the usual fins or heat exchange elements 101 are positioned in between the forward inlet for the warmer air to be recycled and the several fan units which drive such air through the coils and discharge the same into the duct 30 for delivery to the shelves at spaced points.

In this form of the invention where, for example, a unit of from approximately four to five feet across is contemplated, it has been found that a single motor will efficiently drive four centrifugal fans to perform this function of cycling and recycling to maintain the interior at a low and predetermined temperature and to aid in maintaining the low temperature multiple air curtain.

Figure 3:
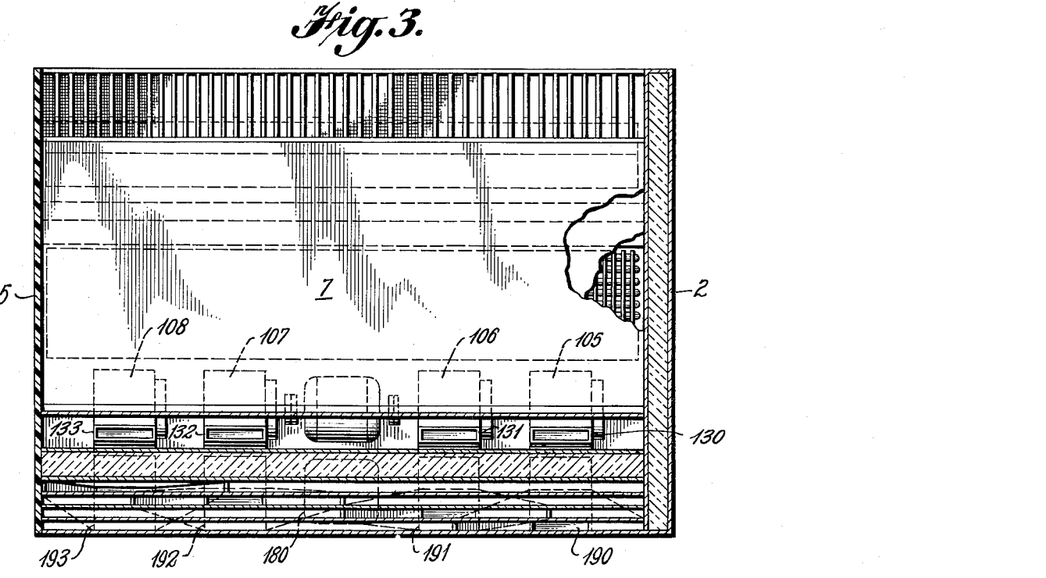
FIGURE 3 is a section view taken on the line 3—3 of FIGURE 2.
Figure 4:
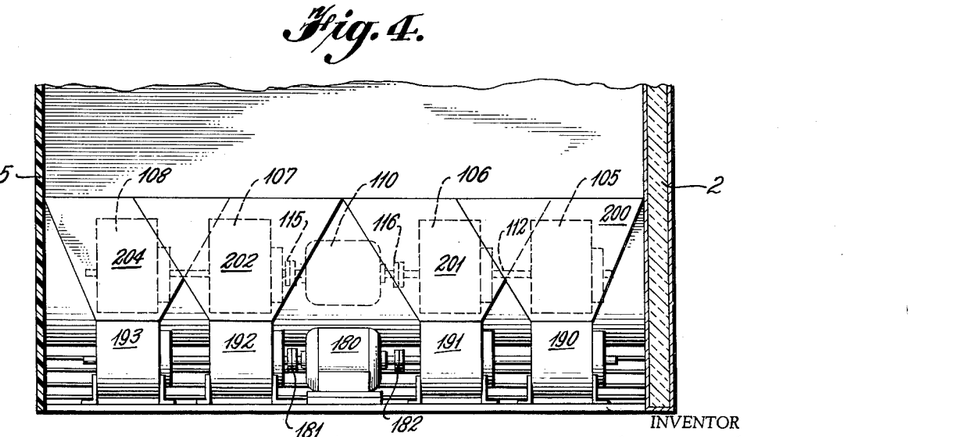
FIGURE 4 is an elevation view of the lower portion of one section of the invention as represented in FIGURE 2 with the back of such section removed showing the disposition of the motor and blower elements for the two circulatory systems found in each section.

Referring first to the internal circulatory system A of FIGURES 3 and 4, it is seen that the refrigeration blower units 105 to 108, inclusive, are driven upon a common shaft 112 by a single motor 110, the latter having flexible couplings 115 and 116 at either side to engage such common shaft 112.

Each of the blower units, 105 to 108, inclusive, is of exactly the same construction and hence, a description of one, here blower 105 shown in FIGURE 2, should suffice for an understanding of the operation of the other three blower units. Each of the centrifugal blowers is of a type where the inlet is positioned axially, the outlets of the blowers being spaced apart as designated at 130 to 133, inclusive. These feed directly into the coldest air duct 30.

The casing for each of the blowers includes a peripheral element 120 contoured to the shape of the blower impeller, this peripheral element terminating on one side in a horizontal plate 122 disposed above the first set of cooling coils and a parallel plate 121 intermediate the rows of cooling coils as seen in FIGURE 2. Additional curved housings such as those shown at 123 and 124 force air into a circular path from the front main inlet through the said coils, through the impeller and back again through the housings and past the refrigerating elements. Finally, the refrigerated and coldest air from this main refrigeration unit is discharged through the discharge opening 130 in each of the blowers directly into the cold air duct 30 for ultimate delivery through each of the shelves and thence downwardly over the upper front of the unit.

Direction of air flow during this cooling process is indicated by the arrows appearing in FIGURE 2 where recurrent passage through the several cooling elements prior to discharge into the unit itself is graphically illustrated. In its progress through each of the blowers, the slots or apertures 130 may be considered bleed-off ports, for these are of such predetermined size as to permit passage of only about one-fourth of the refrigerated air which has been reduced to the desired temperature by the coils 100. Furthermore, such blowers can be furnished with adjustable discharge ports so as to enable proper metering of air flow through the chute 30 and passageways interconnected therewith. At any rate, three-fourths of the air is recycled (in the system A I am here describing) through the refrigerating unit in constant circulatory fashion. The proportional amount of air (about one-fourth) which has progressed through the several bleed-off ports, successively finds its ways, by reason of flanges 52, 62 and 72 into the respective passageways 51, 61 and 71, which form a component part of each of the three shelves. Such air also finally progresses through the top lateral portion of the chute 30 and thence out of the down spout 35. After progressing through the top spout 35 and the ducts in the several shelves, such refrigerated air in each instance is directed downwardly through the respective ports 56, 66 and 76 to ultimately descend into the main inlet 10 for the coldest air. This cycling of the coldest air from the refrigerator in this fashion maintains each of the shelves as well as the back and top wall of the interior of the unit at the desired temperature; furthermore, the downward flow of air through the respective downwardly directed ports 56, 66 and 76 aids in maintaining the desired multiple air curtain over the frontal opening of the cabinet, the latter more directly obtained by the circulatory air system B, to be described.

Provision is made for dehumidifying the air which is picked up along the front and bottom of each of the units and recirculated through circulatory system A which has just been described. Such dehumidifier apparatus takes the form in this instance of refrigerator coils upon which the moisture in this incoming air is deposited as frost. Two coils are used alternately so that while one is performing this function of frost pick-up, the other is being defrosted. In this way there is a constant operation of removing substantially all, if not all, of the moisture from the air directly feeding into the circulatory system A. This concept of humidity regulation is of vital importance in the instant invention for since each of the trays or shelves 6 are actually ducts transmitting and circulating refrigerated air, efficiency would be substantially impaired if the humidity of the incoming air is such as to permit the formation of frost within this circulatory system.

In this embodiment of the invention and as shown in FIGURE 2, two series of coils 140 and 144, respectively, are used to refrigerate the incoming air and, by accumulation of frost upon the coils, to remove moisture therefrom. The coils are positioned along the front of the unit as here indicated and each is partially surrounded by a suitable casing, the coils 140 by a divider 151 and the coils 144 by the divider 152.

As each dehumidifying unit is separately defrosted by the application of heat to the unit in question, the resulting water is caught by the respective casings and fed into an ordinary drain line 155 which in each instance is directly connected to one or the other of the casings and then fed into the main drain line 156.

As seen in FIGURE 2, the inlet for the air to be recycled occupies that lateral portion of the unit extending between the bottom plate 7 and the element 21b which forms a part of the main insulation. The passage of air entering this inlet is controlled by a flap valve 150 which is pivoted as indicated and extends across the front to direct the flow of air either to the unit 140 or to the unit 144. As shown in this figure, this flap valve or shutter is positioned almost vertically, hence the incoming air is directed downwardly to the refrigerator lines 144 and blocked off from the top refrigerating lines 140. Accordingly, moisture in this incoming air is in this instance deposited upon the coils 144. After a predetermined period of time, automatically controlled by suitable timing mechanism, the flap valve 150 is caused to be turned downwardly as indicated in dotted line in FIGURE 2. Upon this movement, the lower coils 144 are shielded from the flow of incoming air and the upper coils 140 then lie directly in the path of same to assume the stated dehumidifying function.

One or the other of the refrigerating or dehumidifying coils, as just referred to above, is thus constantly functioning to remove moisture from the incoming stream of air while the other coils are being defrosted by the application of heat thereto. Sufficient heat can be applied in any suitable manner, as for example, by forcing hot gas from the compressor unit, through those coils which are sought to be defrosted. Such a function also can be suitably timed by known mechanisms, the timer being of a type to control for a predetermined period of time operation of the flap valve and defrosting of the involved series of coils.

The circulatory system B, as shown in FIGURE 2, will now be more specifically referred to. This system operates from the principle that a multiple layer of air, progressively warmer towards the outside of the unit, performs as an effective insulation against both heat and humidity, and further, is effective to reduce turbulence or mixture with outside air to a minimum. The multiple curtain which surrounds the unit is likewise recycled around the exterior of the unit and, at a discharge point at the point at the top and front of the case, descends downwardly across the open face of the unit where it is picked up at the bottom thereof by the circulatory system B. These layers are separately channeled through a series of passageways which extend entirely around the bottom, back and top of each of the units. The passageways are designated in FIGURE 2, and progressing from the outside inwardly, as passageways 160, 162, 163 and 164. The whole series lies between the casing element 20 next to the conventional insulation, and outer-most casing 1. The dividing elements forming these passageways (proceeding outwardly) are designated at 167, 168 and 169. The contour of each of these dividing members which from separate passageways is the same, and each of these passageways terminate in a downwardly directed opening, all of the same extending across the top front of the open showcase. Progressing from inside to outside, these individual discharge openings are shown at 170, 172, 173 and 174, FIGURE 2.

The air so discharged from the multiple air discharge outlets (170, 172, 173 and 174) is adapted to enter into corresponding and diametrically opposed inlets at the bottom of the unit, here respectively indicated at 170a, 172a, 173a, and 174a. In other words, the layer of air emanating from outlet 170 is adapted to be sucked into the corresponding air inlet 170a, air from 172 into inlet 172a, and so on.

There is thus a continuous recycling of the cooled air which descends through the openings last mentioned from top and bottom. Such forced recycling is obtained by the use of a series of blowers located along the rear and bottom of each unit. In this embodiment of the invention, there are four such blowers, 190 to 193, respectively. Each of these is fabricated in precisely the same manner and each one feeds into a different passageway. Accordingly, each blower is provided with a casing 195 which extends upwardly as at 196 to direct the flow of air into a given passageway; in this instance the blower 190 feeds into a casing 200 and thence into the passageway 160, the incoming air being pulled through the usual axial opening in this type of blower as indicated by the arrows shown in FIGURE 2. Thus (see FIGURE 4) the blower 191 forces air through the casing 201 into passageway 162; blower 192 directs recycled air through the casing 202 into passageway 163 and blower 193 discharges the recycled air through the casing 204 into passageway 164. All of these blower units are driven by a common motor 180 upon a common axis, the motor being interconnected to the drive shaft through the usual type of flexible couplings 181 and 182.

From the foregoing, and with respect to the description of the embodiment set forth above, it will be understood that there are two separate circulatory systems. The first, system A, forces the coldest refrigerated air through the top opening 35 and each of the shelves in the cabinet and thence downwardly through the several openings 56, 66 and 76. The second, circulatory system B, obtains cooling firstly, by the cooling effect of positioning such passageways immediately adjacent the conventional insulation 23, thus incidentally reducing low temperature loss through the latter; and secondly, by the adjacent positioning of the exterior air streams to the coldest air streams of system A which flow downwardly over the open front. Each passageway then discharges down the open front of the cabinet to form a multiple cool air screen effective to reduce turbulence and exert a blanket effect against the warmer air at room temperature. Discharged air of the first system is primarily recycled through the inlet 10, discharged air from the separate passageways is primarily recycled through the several inlet and corresponding channels at the bottom of the cabinet.

As further explanatory of the method of cold air protection obtainable through use of the instant invention, it should be appreciated that the refrigerated air emanating from the opening 35 at the top of the cabinet, and from each of the frontal openings in the several shelves, has only a short distance to traverse. In carrying out the concept of multiple air curtain "insulation," this factor is thus of the greatest significance: that the traverse of air is most feasible for short runs, this comment here being directed to the coldest air of below zero temperature which is within the cabinet itself. By way of example, taking the representative height of six and one-half feet for the entire unit, it is contemplated that the distance between shelves would approximate thirteen to fifteen inches. Thus, air emanating from the opening 35 at the top of the cabinet and at a temperature of say −10° F. need only traverse that relatively short distance before it is met and replenished by the next cold air stream emanating from the top-most shelf through opening 56. This short traverse is characteristic of the other shelves, i.e., the second layer of air proceeding from the second shelf opening 66 is also protected from moisture, heat and turbulence by the cold air stream which is directed downwardly through the top shelf opening 56, and so on. This theory of confining the distance of traverse of the coldest air and protecting each successive shelf by the downwardly projected stream of cold air which emanates from a higher point enables operation wherein the constant to be desired can be kept within a minimum range, i.e., approximately ten degrees within the desired range rather than permitting fluctuations of a greater order. It is thus seen that in each instance the first layer of cold air insulates and protects the second layer from three factors otherwise adverse to proper frozen product protection; heat, moisture and possible turbulence created by friction with other, warmer air.

It is contemplated that in the practice of the invention these air streams, to diminish the possible turbulence of air, are each projected at approximately the same rate of speed. Here is meant not only the four streams of air which encircle the outer insulated casing of the cabinet but those streams of coldest air which are projected downwardly from the ducts within each of the several shelves. It has been found that the velocity of the air can be relatively slow, i.e., approximately 56 cubic feet per minute through each of such openings (i.e., openings 35, 170, 172, 173, 174 across the top and the individual openings 56, 66 and 76 in each of the shelves). Thus, with this estimated movement of air the total will amount, in the over-all unit, to approximately 400 c.f.m. In referring to air flow of this order, the size of the individual unit contemplated will be of the order of seven and one-half feet in height, five feet in width, and three and one-half feet deep.

The protective screen of air, since it is in multiple layers at different temperature gradients, is not substantially increased in temperature by contact with room air. This is because the outer layer of air or that flowing through duct 160 to be discharged at outlet 174 will be at a temperature only approximately 10° lower than air at room temperature, assuming the latter to be at 70° F. For example, if air is discharged at outlet 174 at 60° F., during its progress downwardly the same would ordinarily be heated by contact with room air. However, the next layer of air emanates from the top outlet 173 at 50° F. and tends to keep the layer from 174 cool. The result will be to maintain the latter layer at about the same constant: 60° F. This same procedure is characteristic of the remaining layers of colder air toward the interior of the cabinet, so that the coolest air discharged from the inside of the multiple air layer or from the opening 170 is still not appreciably raised above its desired constant of 30° F. As to this inner cool air stream, emanating from outlet 170, the same will not be appreciably warmed by the air at room temperature for it does not contact room air, being protected by the three intervening layers of gradually increasing temperature between this stream and the outside, room temperature air.

Referring to FIGURE 2, the air outlets across the top, frontal portion of the unit are marked by a dotted line indicated as "Point X," whereas the various inlets at the bottom of the cabinet are earmarked by the dotted line designated "Point Y." It is seen that each channel of air flow at point X is opposed by an air inlet at point Y. Thus the top openings 170, 172, 173 and 174, at point X, have below them corresponding inlets 170A, 172A, 173A, and 174A, at point Y. The various openings for the coldest air, openings 35, 56, 66 and 76 are all above the opening 10 for the coldest air at the base of the cabinet, the latter directly feeding into first the dehumidifier assembly and then the main refrigerating means and circulatory system. It should thus be understood that the foregoing arrangement is such that only the coldest available air enters the inlet 10, with the next coldest air entering the inlet 170a, the next coldest, the inlet 172a, etc. For a further understanding of the nature of this air curtain principle, the following chart represents the approximate functioning of the unit insofar as the protective curtain is concerned.

*Chart Indicating Temperature Gradients*

(Temperature in Fahrenheit degrees)

| Multiple Air Curtain Outlets | At Point "X" | At Point "Y" | Multiple Air Curtain Inlets |
|---|---|---|---|
| 170 | plus 30° | plus 30° | 170a |
| 172 | plus 40° | plus 40° | 172a |
| 173 | plus 50° | plus 50° | 173a |
| 174 | plus 60° | plus 60° | 174a |
| Upper Outlet | At Outlet | At Shelf 50 | At Inlet 10 |
| 35 | −10° | 0° | plus 20° |
| 56 | −10° | At Shelf 60 0° | plus 13° |
| 66 | −10° | At Shelf 75 0° | plus 7° |
| 76 | −10° | At Bottom 7 0° | 0° |

The above chart is intended to illustrate only one set of typical temperatures which are only approximately correct for one setting of the controls. The showcase of the invention is capable of other temperature gradients and other temperatures. In fact, and as an example, with the proper settings the coldest air at point X can be plus 40°. Then the temperature gradients will progress to a room temperature of 70° in much smaller steps. Thus while the functions of the invention have been described with respect to the temperature gradients suitable for frozen foods, the apparatus of the invention works equally well for other products, such as dairy goods, the latter involving higher temperatures. The desired temperature gradients can be attained and controlled simply by thermostats which regulate the suction pressure of the refrigerant in the coils.

The desideratum of obtaining effective insulation for "short runs" of the air stream is illustrated in the above chart by reference to the temperature emanating from the upper opening 35. At point X this temperature is −10° F. Temperature increase in any substantial amount by contact with the layer of air emanating from opening 170 does not occur because the traverse distance of the coldest air from opening 35 is only approximately 14 inches, i.e., from the top of the cabinet to the first shelf. Hence, this cold air supply is replenished at the discharge outlet 56 of the next shelf, thus rigidly maintaining the desired low temperature of −10° F. In further illustrating this point the above chart indicates that at shelf 50 the temperature will not reach above zero degrees F., it being apparent that with cold air discharge at 66 and 76 the immediate curtain in front of the shelves will reach the point of re-entry, 10, into the refrigerator apparatus at a temperature of no more than zero degrees F.

There is another aspect of insulation accomplished by the mechanism performing this multiple air concept. For example, referring to FIGURES 2, 5 and 6 it is seen that there are four layers of air from inside to out which respectively have a temperature gradient of 30°, 40°, 50°, and 60°. As is customary in the fabrication of any such insulated unit, the side wall 5 on each side of the unit is metallic and ordinarily insulation of conventional material would have to be provided along the contacting corners of this side wall where contact is made with each of the passageways for the separate layers of air. Ordinarily, this would pose a practical problem of effective insulation. In the instant construction however, each layer is at a lower temperature than the adjacent layer, and thus the metallic lining is gradually cooled until it reaches −10° F. at the interior of the cabinet. Hence, the multiple passageways effectively prevent temperature loss, by conduction of heat through the metallic end linings, for the end portions thereof are gradually warmed to a maximum of 60° F.

This same feature of multiple, exterior, cool air passageways minimizes the formation of condensation upon the outside (i.e., top, backwall and bottom) of the cabinet, inasmuch as the temperature difference between room temperature and the outside metallic wall, as backwall 1, is only 10°. That is, this outside wall will be at a temperature of approximately 60° F. With room temperature at 70°, the 10° temperature differential is such as to preclude frosting and also inhibits condensation. It has been found that even with respect to the passageway adjacent the cabinet, passageway 164, the temperature therein, 30° F., is not sufficiently low to involve frosting. Furthermore, this air has been comparatively dehydrated for it has mixed somewhat with the very dehydrated and coldest air, and thus does not contain enough moisture to cause substantial condensation. Additionally, any condensation that may be formed in this interior channel or passageway can be accounted for by suitable drainage lines at the bottom of the cabinet.

Another embodiment of the invention is shown in FIGURES 6 to 11, inclusive. Here much the same construction is involved, but greater emphasis is placed upon the structure which permits fuller control of the metering of the cold air supply. This unit has a similar series of passageways surrounding the entire unit and again referred to as forming a part of the circulatory system B. A different arrangement of elements is utilized, however, in controlling air flow within the cabinet and in automatically dehumidifying the coldest, recycled air. In this embodiment, finer adjustments for metering the cold air supply, particularly through each of the shelves, is possible.

Figure 6:
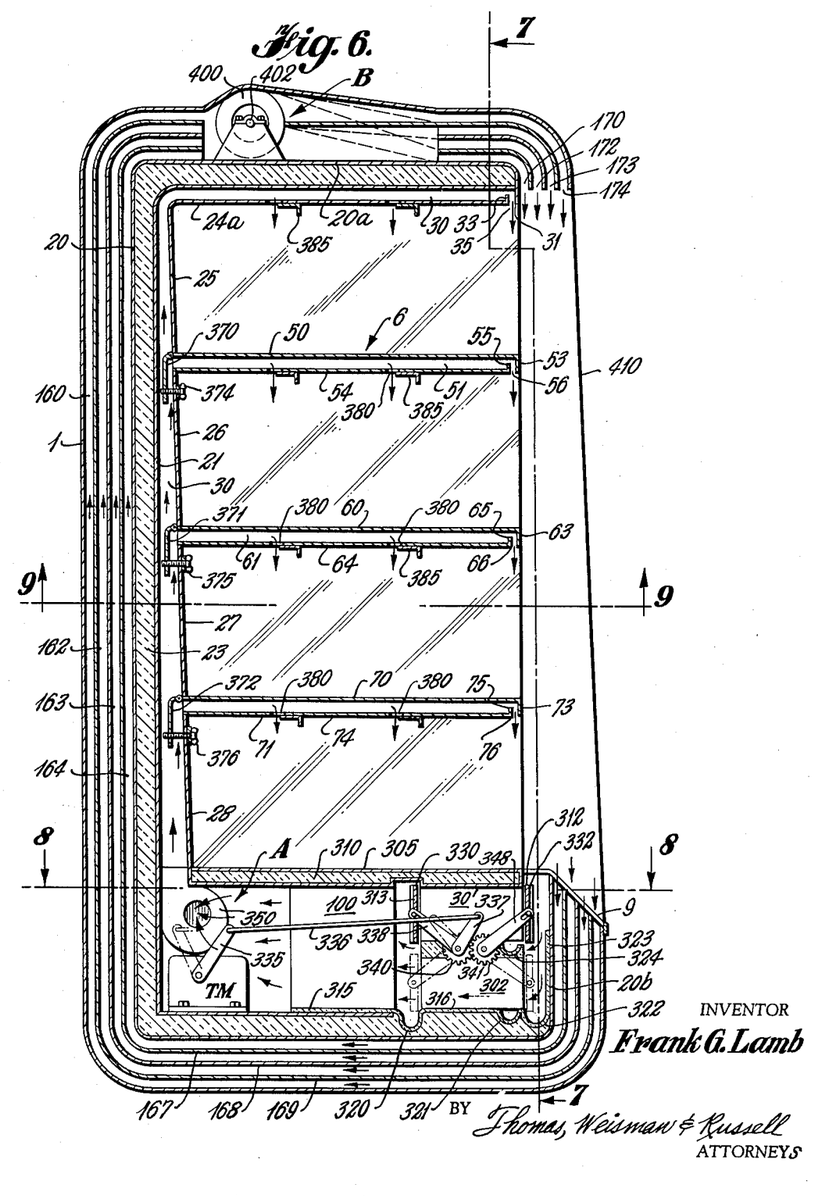
FIGURE 6 is a vertical cross-sectional view of a preferred embodiment of the invention, and showing air control means in one position covering a dehumidifying coil during defrost thereof.
Figure 7:
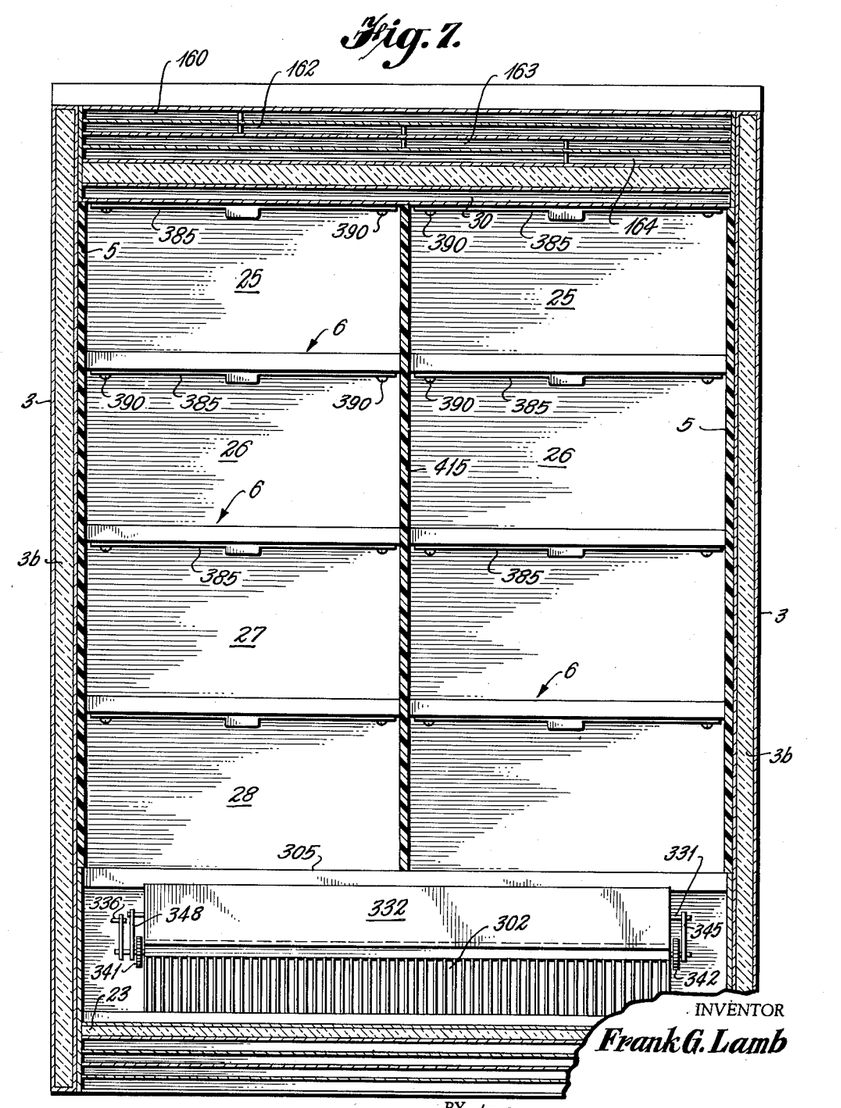
FIGURE 7 is a section view taken on the line 7—7 of FIGURE 6.
Figure 10:
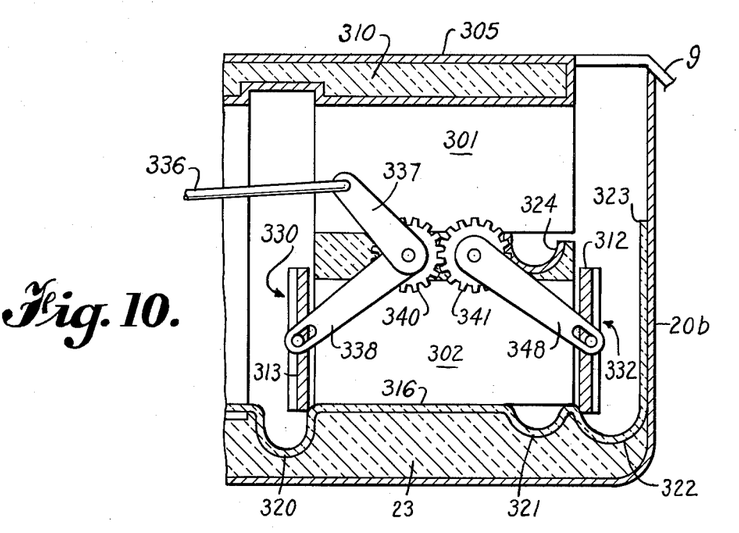
FIGURE 10 is a greatly enlarged, fragmentary, sectional view showing the position of dehumidifier coil control means in another coil defrost position.
Figure 11:
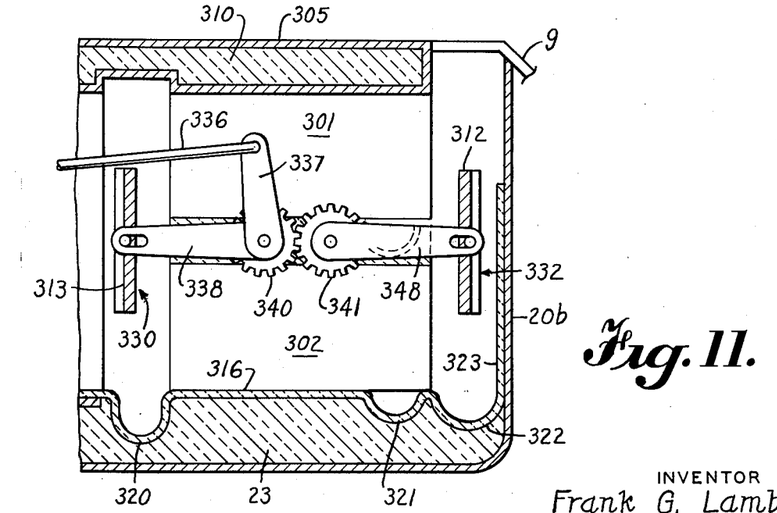
FIGURE 11 is a view similar to FIGURE 10, but showing the coil control means in an intermediate position.

Again referring firstly to the circulatory system A, it is seen that the same general type of main refrigeration unit 100 is employed and located in the same relative position as indicated in, e.g., FIGURE 2, described above. The two dehumidifying units, here 301 and 302 are located, as in the former case, in the front of the cabinet and at the base thereof. The bottom of the cabinet 305 is here shown as provided with insulation 310, both coil systems being located immediately under this bottom element 305. Two adjustable dampers, 330 and 332, are used to close off one of the dehumidifying coils when the other is functioning to remove moisture from the coldest air which descends downwardly over the front of the cabinet. Referring to FIGURES 6, 10 and 11 it will be seen that the dampers 330 and 332 are controlled to move from the position shown in FIG. 6 (covering the front and rear of the top coil 301) to an intermediate position shown in FIGURE 11 (wherein the dampers are spaced from both coils 301 and 302 to permit air flow through both coils) and then to the position shown in FIGURE 10 (covering the front and rear of the lower coil 302). Each of the coils 301 and 302 is defrosted in a relatively short period of time in alternate cycles during operation of the main refrigeration coil 100, and then the dampers 330 and 332 are moved to the intermediate position (FIGURE 11) thereby facilitating air flow and more efficient dehumidifying than with only one coil—particularly as the coils accumulate frost during the operative periods thereof.

The control takes the form of a known type of timer mechanism TM which by suitable links 335 and 336 is directly interconnected with a control rod 337. The latter is fixed to a link 338 and the latter, by a pin and slot interconnection with the damper 330, functions to lower or raise each of the dampers to the desired position. The link 337 is also interconnected to a cog wheel or gear 340, the latter driving another small cog wheel or gear 341. The driven gear 341 is adapted to pivot an additional link 348 which in a like manner, operates the outside damper 332.

Figure 8:
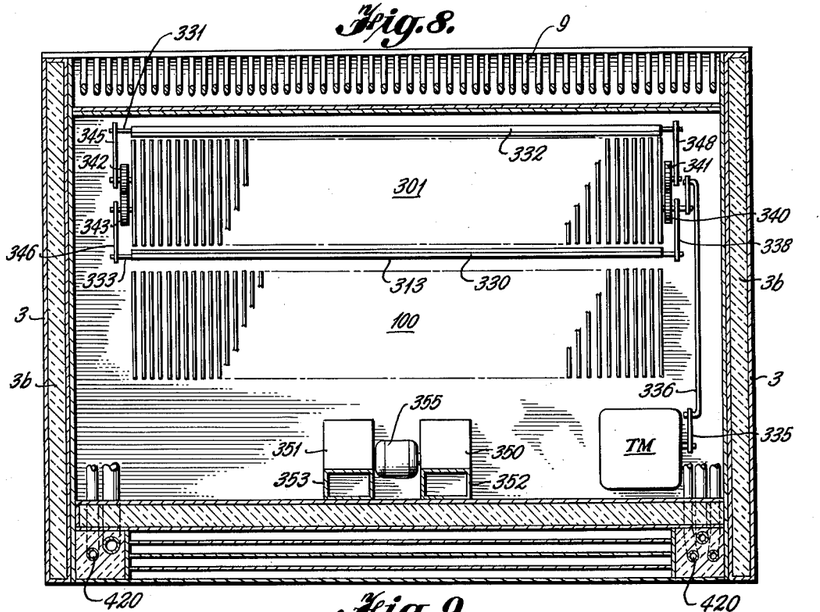
FIGURE 8 is a section view taken on the line 8—8 of FIGURE 6.

The opposite side of the damper control mechanism which has just been described is of the same construction. Referring to FIGURE 8, it is seen that two similar engaging gears 342 and 343, are respectively connected to the control rods 345 and 346, which support and control the dampers 332 and 330 at the other side of the unit. The rear damper, is as explained above, pivoted for the described movement upon a centrally positioned pivot 333 and similarly, the forward damper 332 is pivoted upon the pivot pin 331, such pivot pins extending across the width of the two defrost coils.

Defrosting of the main refrigeration mechanism 100 is preferably accomplished by forcing hot gas from the compressor unit through these refrigeration coils. Specific means for by-passing the hot gas line of the refrigeration system to force this media through the main refrigeration coils is not here shown, it being sufficient to point out to those skilled in the art that such means can be automatically timed to defrost the main coils in this fashion or at any predetermined and spaced periods of time which appear to be desirable. Since the air entering the main refrigeration unit is practically dry, the moisture having been removed by the preceding defrost coils, the main coil 100 will collect very little frost and will not require defrosting more than once in every twenty-four hours.

Defrosting of the dehumidifying coils 301 and 302 is mainly accomplished by timed cycling of the hot gas from the refrigeration mechanism through such coils. Heating elements such as those indicated at 312 and 313 are utilized to prevent ice from forming and sticking the dampers 332 and 330 shut. Such heating elements can be of the electric blanket type, thermostatically controlled or controlled by suitable timer mechanism to be actuated for defrost purposes at timed intervals, the interval here being more frequent than with respect to the main refrigeration unit, defrost being accomplished for example, of a given defrost coil, every two hours. Commercial heating elements for the desired function are well known, as for example those sold under the trademark "Uskon." At any rate, and taking the example of FIGURE 6, it may be assumed that the upper dehumidifying coil 301 is being defrosted in the manner indicated. The heating elements which are here shown are affixed to the two dampers on each side of that coil. Such coil 301 is at this time insulated from the other refrigerating system by such dampers. During defrost of one coil, the other defrost coil 302 is at normal refrigerating temperature and the air from duct 10 now passes over the latter coil which cools such air and removes practically all its moisture.

Several drain troughs are provided for carrying off the condensate, such as the troughs 320, 321 and 322 at the base of the unit, and the trough 324 which runs in between the two dehumidifying coils 301 and 302 and is adapted to receive condensate from the upper coil 301. All four drain lines are adapted to lead to additional discharge lines for discharge of condensate exterior to the cabinet, the latter not being shown herein.

To prevent freezing of condensate during periods of defrost of either the main refrigerating coil or either of the dehumidifying coils 301 and 302, additional heating elements are located around these respective units.

With respect to the main refrigeration coil 100, the heating element 315 is positioned underneath the base of this element and extends down into the trough 320 so that during periods of defrost of this main coil the condensate is not frozen but remains in liquid form to be discharged into the trough 320 and out of the unit.

Similarly, the two discharge troughs 321 and 322 are lined with a like type of heating means indicated at 316 and 323. The heating element 316 is located immediately underneath the lower defrost unit 302. An additional heating element 323 extends along the vertical member 20b; in other words the same is mounted exactly opposite the two defrost units 301 and 302.

These heating units which extend along the base and lower front of the unit can also be automatically timed by known circuit controls so that when the main coil is being defrosted the heating element 315 is also actuated to assure free flow of condensate. A like timing of actuation of the heating elements 316 and 324 is accomplished during alternate functioning of either the defrost coil 301 or the defrost coil 302. In all events a small electrical pump may be utilized for forced discharge of frost water, if so needed.

Circulation for the coldest air in the interior of the cabinet is obtained through a blower arrangement similar to that described with respect to the embodiment of the invention of FIGURE 2. In this instance, however, two centrifugal blowers 350 and 351 (FIGURE 8) have discharge outlets 352 and 353, respectively, that lead directly into the space or duct 30 between the two wall elements 21 and 28. These two blowers are diven in unison by a motor 355 mounted upon a common shaft with such blowers. Here again, the coldest air descending from the outlets of the respective shelves is forced, first through the dehumidifying arrangement just described, and thence through the main refrigeration unit 100, to be picked up by the two identified centrifugal blowers and forced upwardly along the duct 30, laterally through each shelf and laterally through the top outlet 35.

However, in this version of the invention, more precise metering of this air flow is obtained through the use of hinged elements located upon the back of each shelf and within the referred to cold air duct 30. In each instance the hinged elements 370, 371 and 372 are pivoted to the top plates 50, 60, and 70 of the respective shelves. Obviously, if such hinged elements are moved towards the front, less cold air is permitted to flow through the duct formed by each of the shelves 6; whereas, if these hinged flaps are moved towards the rear, a maximum amount of air flow is obtained through each shelf since there is a maximum pick-up by each flap. Such a mechanism permits fine adjustment of the amount of air flow through each shelf and permits also the obtaining of a predetermined ratio of air flow within prescribed limitations to meet optimum performance. Ordinarily, the scoop 372 will be adjusted to scoop approximately one-fourth of the cold air, scoop 371, one-third thereof, and scoop 370 one-half of the remainder.

Adjustment of each of these flap metering elements is obtained by a fixture in the form of a screw element such as those shown at 374, 375 and 376. These are threaded into an appropriate aperture in each of the pivoted flaps and so located as to be within reach of the operator from the front of the unit. Thus, by turning such threaded control member to right or left the amount of inclination of the particular flap involved can be readily adjusted.

Figure 9:
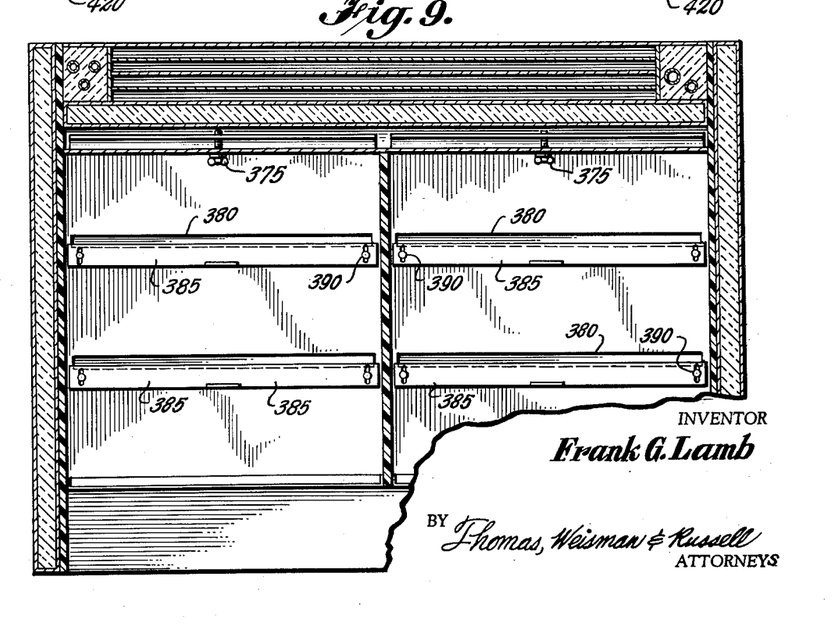
FIGURE 9 is a section view taken on the line 9—9 of FIGURE 6.

An additional and adjustable metering of the air flow is also obtained, in this version of the invention, through appropriate mechanism positioned in the lower plate of each of the shelves as well as the plate 24a which comprises the inside top of the cabinet. This control takes the form of a series of slots 380 in each of the shelves (FIGURE 9) through which cold air is permitted to pass within prescribed limits as indicated by the directional arrows found in FIGURE 6. The amount of such air flow is controlled by using a series of lateral slides 385 that are positioned adjacent to each of these slots and can be used to entirely close a given slot or to open the same an amount which has been determined to be the best for peak performance. When positioned in desired relationship to each of the slots 380, these slide elements 385 are locked in position by suitable screw elements 390 (FIGURE 9).

The two-fold metering of the coldest air (i.e., metering through adjustment of the flaps such as flap 370, and metering obtained by adjustment of the slides 385 over the respective slots 380) enables proper balancing to obtain efficient cooling of all frozen food packages on each shelf. Such packages are cooled on each shelf by conduction, and by air flow through packages underneath the several cold air outlets, cold air descending to the packages immediately underneath. The upper portion of each shelf space is also cooled by conduction through the hollow metal shelf above. In addition to this cooling by conduction through the cold air ducts which form the bottom, back and top of each shelf, cold air emerging from each shelf through the metered slots 385 reduces the tendency of warm room air to enter the interior shelf space by creating a slight outward motion of the cold air in this space. It should further be observed that the cooling layer is further protected by the falling air streams which emerge from the openings in the forward end of each shelf, namely openings 35, 56, 66 and 76, these openings being continuous and extending along the entire front edge of all shelves above the lower shelf. Additional insulation and protection against room air entering this interior shelf space is secured by the protective layers of air emitted from the top outlets 170 to 174, inclusive, as these air streams move downwardly from such openings to their pick-up point at the bottom of each unit.

In the foregoing discussion, reference to metering of air flow by means of adjusted or adjustable openings is not intended to imply continuous, automatic or periodic manual changes in the setting of such metering devices. They do, however, signifiy that optimum air flow is obtained by proper balance of the involved variables, such as motor speeds, motor power, blower characteristics, duct sizes, and size of air discharge openings, all of which constitute variants which can be readily coordinated by those skilled in the art to achieve peak performance of the unit.

There is present a natural and "internal" resistance in this air flow circuit and thus slight changes in external resistance such as results from the frosting of the dehumidifying coils do not materially affect the amount of air discharged through either the openings in the lower plate on each of the shelves or the downwardly directed discharge openings at the end of each of the shelves. However, consideration of such factors as those mentioned is important to maintain uniform air flow during the entire operating time between defrost cycles. In any event, the metering adjustments such as the described flap elements at the back of each shelf are set to secure proper distribution of air to the several hollow shelves. Once set, these adjustments are locked in place and require no further attention.

Similarly, the thickness of the air streams which form the multiple curtain of air and which are discharged through the several openings at the top of the unit, namely openings 170, 172, 173 and 174, is predetermined by forming such downwardly directed discharge ducts to deliver air streams of the desired width to form an air wall of substantial depth from the display area outwardly. The velocity of these air streams at the point of emerging from their respective ducts can be so controlled as to obtain minimum turbulence with maximum protective effect. Such can be accomplished by adjusting the size of the corresponding blower inlets which feed the lower inlets to the blowers effectuating circulation of the external air streams, i.e., those primarily forming the protective and downwardly projected multiple curtain of cold air. Hence, the instant invention presents apparatus which enables maintaining the correct relationship between air velocities and volume, thus achieving a multiple air curtain which effectively attains and preserves low temperatures within the cabinet, despite the open front construction.

It is further to be observed that in following the novel scheme of this invention, the flow of cooling and protective air must be continuous. If the delivery of cold air to the metered openings in each of the shelves (as described with respect to the second embodiment of the invention) is interrupted, even for relatively short periods of time, warm and humid air will circulate through the product filled packages on the shelves; the packaged goods will then become warmer and heavy condensation results. In this event, the package loaded shelves could not be defrosted without producing an undesirable mass of ice and water among the products stored thereon. Accordingly, in the concept presented by this invention, provision is made for a system which will continuously supply cold air through the hollow shelves and through such metered openings without interruption and without any significant increase in temperature during the defrosting period. Such is achieved by the combination air cooling and dehumidifying system housed in the base of this novel unit and by alternate defrosting incorporated in the refrigeration system which may be housed in the base of the cabinet, as shown in FIGURES 2 and 6.

A further differentiation in this version of the invention is found in the relative location of the blower arrangement for the external circulatory system B, i.e., the cycling of the air in layers around the periphery of the unit. Here a series of blowers 400, four in number, are located upon the top of the unit as shown in FIGURE 6. Although all of these blowers are not shown, they are positioned in much the same manner as the blowers heretofore described with reference to FIGURE 2, each of them being mounted upon a common shaft 402 and feeding separately into one of the different passageways 160, 162, 163 and 164, as may be understood from inspection of FIGURE 7.

In this invention also, use is made of a curtain 410 as diagrammatically indicated in FIGURE 6 which is adapted to enclose the entire front of each unit during periods when the same is not open for use, i.e., at night when the desired temperature is maintained, but the metering air streams are not permitted to intermingle at all with any air at room temperature.

I have also found it expedient to divide the shelves by the use of transparent plastic or glass uprights 415 (FIGURE 7) which not only effectively support the several shelves, but also reduce the effect of room air movement on the protective air curtain.

The entire cabinet is so constructed that liquid lines, suction lines, and hot gas defrosting lines such as those generally indicated at 420, as shown in FIGURES 8 and 9, as well as electrical power and control lines can enter either below or above the cabinet, this feature permitting installation in existing buildings without cutting trenches in the usual concrete flooring. As originally installed, with overhead lines, the cost of expanding or changing the arrangement is much less, as a result of this design, since new trenches need not be cut into the floor, nor old trenches filled or covered. Although a series of ducts are disclosed for discharging a wall of air of substantial depth across the front opening of the display area and for recirculating this air, it will be readily apparent from the foregoing that a single duct of suitable design may be utilized for forming such a wall of air having a temperature gradient thereacross.

As indicated in the foregoing, the unit or units constituting this invention may be operated by an automatic control system, the latter receiving signals which indicate the start or end of certain time periods pertinent to the operating cycle. Such a system contemplates reception of signals which indicate the existence of certain temperature conditions. Controls of this type are well known to the art. Also, timing mechanisms which can suitably time the periods of defrost for the main refrigerating element as well as the dehumidifying coils are well known to the art. Hence, these specific, known circuits do not constitute a part of this invention, and are not specifically disclosed herein. Reference is therefore made only to the over-all functioning which is obtainable by the use of such circuits: a repeat cycle timer can be used to transmit the signals which start the defrost cycle, such timer being electrically driven and controlling the alternate defrosting of either defrost coil at any time intervals set into the timer. After the recovery period of either defrost coil from the defrost condition to full refrigeration temperature has been determined experimentally, this time is set into the timer. The timer can then be organized to transmit to the automatic control system that the coil last defrosted has recovered to full refrigerating temperature. Known elements, such as appropriate latching relays, can be utilized in such a circuit to transmit this cycle of two time signals alternately to the two dehumidifying coils on defrost of the same. When the suction line of a particular coil reaches the temperature which indicates complete removal of frost from all parts of the coil, its temperature control unit can be made to signal the automatic control to stop defrost. A system of relays can be incorporated in the automatic control unit which will operate to actuate the elements of the refrigeration and defrost systems to obtain the operation called for by the received signal.

From the foregoing it will be understood that the basic concept of this invention is the provision of thermal insulation of the open front of the cabinet by the protective action of downwardly progressing cold air streams emerging from the several smaller ducts or the single larger duct positioned at the top frontal opening of the cabinet. In addition, cold air emerges from the adjustable vents provided in each of the shelves, as well as the top, and this also joins the descending air stream. Air emerging from the downwardly directed passageways in the front of each shelf additionally forms a cold, downwardly directed stream immediately in front of all of the shelves. Being vertically disposed, the progress of all such cold air streams is facilitated by natural convectional forces. Any tendency for these air streams to increase in temperature during downward movement is counteracted by the cold air emerging from the adjustable vents 380 which flows over and in contact with the packages on the shelf immediately underneath. As this composite air stream moves downward to the bottom of the unit, any temperature drop is further counteracted by the relatively cold air stream emerging from the adjacent multiple passageway openings such as 170. This process is repeated in front of each shelf and thus a temperature gradient is established in this composite air stream from very cold (−10° to −15° F.) on the side nearest the cabinet to a temperature only slightly below room temperatures on the side farthest from the cabinet.

The cold air emerging from the discharge point, as for example outlets 35 and 56 on the one hand and slots 380 on the other, is practically, if not completely, dry. The humidity gradient thus established in this descending air stream greatly reduces, if not eliminates, any tendency for frost to form on shelves and packages.

The cool cumulative effect to the air streams, properly adjusted in volume and velocity and produced and directed as described herein, to maintain the indicated temperature and humidity gradient, forms the thermal insulation which, in this invention, achieves storage and display on open front shelves at below zero temperatures without excessive frosting and without discomfort to the shopping consumer.

In addition to the foregoing, i.e., achievement of low temperature control within the cabinet, the system also provides for effective thermal insulation of the bottom, back and top of the cabinet. Although only approximately two inches of conventional insulating material may be used on these surfaces it has been found that the temperature gradient of this air is in the vicinity of 40° F. and colder. As this air passes through the multiple air ducts along the back of the unit, through the blowers on the top of the case (as in the second embodiment described herein) to the several respective discharge ducts, it is in contact with the metal sheathing which contains the insulation 23, thus any thermal losses through the insulated outer wall 20 will lower the temperature of the air passing through the adjacent duct (164) and this in turn will lower the temperature of the air discharged from this particular duct, thus increasing the efficiency of the protective air stream. In like manner, thermal transfer from duct 164 to duct 163 will lower the temperature of the air in the latter and some of the loss in the first duct will be recovered by an increase in the effectiveness of the air stream in the second duct, 163. The same applies to the two outer ducts (herein referred to at 160 and 162). The air discharged from the outside duct will be only a few degrees below room temperature and that is also true of the air entering this outside duct at the bottom of the frontal opening of the unit. Due to this small temperature difference, there is very little thermal transfer from room air to the layer of air represented by that which is discharged from the outside duct (here indicated at 174). It is also to be noted that the low dry bulk temperature of the air entering the duct closest to the casing permits the use of a comparatively thin insulated layer of conventional material, such as that indicated at 23, yet without condensation of moisture on the outer shell 1 of this structure.

In the foregoing, a novel concept, method and mechanism have been disclosed which presents the practical solution to those difficulties heretofore encountered in the construction and operation of the open type of refrigerated showcase. Although it is obvious that the principle of the invention may be varied in many ways and other expedients or alternates employed to accomplish the purposes hereof, it is to be understood that my invention is to be limited only to that scope expressed by the following claims.

What is claimed is:

1. In an open front refrigerated cabinet, an internal cold air cooling and recycling system and an air recycling means for cold air externally of said cabinet, said system including at least one shelf having a passageway therethrough, said passageway terminating in a downwardly directed spout at the edge toward the front of said case, said means including a plurality of adjacent ducts around said cabinet terminating in downwardly directed discharge points at the top of said open front, the outer of said ducts being in contact with air at ambient temperature, a refrigerating means for said cabinet, and means at the bottom of said case to pick up air from said spout and said discharge points and recycle same to said shelf and said ducts.

2. In an open front refrigerator cabinet having display shelves therein, said shelves having cold air passageways therethrough terminating in downwardly extending spouts at the front thereof, means to force cold air through said shelves, multiple cool air ducts around said cabinet terminating in downwardly directed openings above said spouts, means to refrigerate and to recycle said cold air and said cool air through said shelves and said ducts respectively, a dehumidifying means for air entering said ducts and said passageways comprising at least two refrigerating coils for the collection of frost and means to defrost said coils alternately so as to render said dehumidifying operation continuous during operation of said refrigerating means.

3. In an upright, open front refrigerator cabinet having laterally disposed display shelves therein, said shelves having cold air passageways therethrough terminating in downwardly extending spouts at the front thereof, a vertical cold air duct in back of said shelves and in interconnection therewith, means to force cold air through said duct, said passageways and said spouts, multiple adjacent cool air ducts around said cabinet terminating in downwardly directed openings above said spouts, said ducts being in heat exchange relationship with the exterior of said cabinet, the outermost of said ducts being in contact with air at ambient temperature, means to refrigerate and to recycle said cold air and said cool air through said passageways and said multiple ducts respectively, and means for metering the amount of air to each of said shelves comprising adjustable air pick-up members at the back of each shelf and extending into said cold air duct.

4. In an upright, open front refrigerator cabinet having laterally disposed display shelves therein, said shelves having cold air passageways therethrough terminating in downwardly extending spouts at the front thereof, a vertical cold air duct in back of said shelves and in interconnection with said passageways, means to force cold air through said duct and said passageways, multiple adjacent cool air ducts around said cabinet terminating in downwardly directed openings above said spouts, said multiple ducts being in heat exchange relationship with the exterior of said cabinet and the outermost of said ducts being in contact with air at ambient temperature, means to refrigerate and to recycle said cold air and said cool air through said passageways and said multiple ducts respectively, and metering means in said cold air duct and in said shelves for adjusting air flow through said shelves, said duct metering means comprising adjustable air pick-up scoops in said cold air duct and depending from each of said shelves, and shelf metering means comprising a slot in each shelf having an adjustable cover thereover to enable adjustment of the size of said slot, whereby the amount of air passing through said spouts and said slots can be proportioned and adjusted.

5. In an upright refrigerator showcase having an open front, a series of hollow, laterally disposed shelves, said shelves having downwardly extending discharge openings at the front thereof, said discharge openings being in approximate vertical alignment, a cold air duct behind said shelves and interconnected therewith, said duct having a discharge outlet above said discharge openings, means extending into said duct to adjust the amount of cold air feeding into each of said shelves, a refrigerating means for said showcase, means at the bottom of said case to pick up and recycle descending cold air from said discharge openings through said refrigerating means, said duct, and said shelves, and a series of passageways surrounding said showcase, the outermost of said passageways being in contact with air at ambient temperature, said passageways terminating in downwardly directed cool air outlets at the top and front of said showcase, said outlets being arranged to direct layers of air in approximately parallel relationship with said vertical alignment of said discharge openings to provide a curtain in front of said descending cold air, and means to force cool air from said cool air outlets and said discharge openings through said passageways.

6. In a refrigerator cabinet having an open front, a series of laterally disposed shelves therein having cold air channels therethrough, said shelves having downwardly extending discharge openings at the front thereof, a cold air duct behind said shelves and interconnected with said channels, means extending into said duct to adjust the amount of cold air feeding into each of said shelves, elongated, adjustable slot means in each of said shelves to permit cold air to be discharged downwardly to the shelf below, a refrigerating means in said cabinet, means at the bottom of said cabinet to pick up and recycle descending cold air from said discharge openings through said refrigerating means, said duct, and said shelves, means in interconnection with said refrigerating means to dehumidify said cold air prior to reaching said refrigerating means, said dehumidifying means comprising at least two refrigerating coils for the collection of frost, and means to defrost said coils alternately in timed relationship so as to render said dehumidifying operation continuous during operation of said refrigerating means.

7. In a refrigerator system for an open front showcase, means to recycle air at the bottom and front of said showcase comprising an air inlet at said bottom and front and a blower means in interconnection therewith, a main refrigeration means in interconnection with said blower means, and a dehumidifying system for said air positioned in advance of said main refrigeration means, said system comprising two refrigeration coils, damper means arranged to cover first one and then the other of said coils during defrosting thereof, and heating means on said damper means to prevent freezing of condensation from said coils after defrosting thereof.

8. In a refrigerator system for an open type showcase, means to recycle air at the bottom and front of said case comprising an air inlet at said bottom and front and a blower means in interconnection therewith, a main refrigeration means in interconnection with blower means, and a dehumidifying system for said air positioned in advance of said main refrigeration means, said system comprising at least two refrigeration coils, pivoted damper means arranged to pivot to cover first one and then the other of said coils during defrosting thereof, heating means on said damper means to prevent freezing of condensation after defrosting of said coils, and means to pivot said damper means at timed intervals to provide a closed chamber for first one and then the other of said coils during operation of said main refrigeration system.

9. In a refrigerator system for a showcase having an open front, means to discharge cold air in metered streams down said open front, means to discharge a multiple curtain of progressively warmer air in front of said metered streams and at the same velocity thereof, means to recycle the air of said metered streams at the bottom and front of said showcase comprising an air inlet at said bottom and front and a blower means in interconnection therewith, a main refrigeration means in interconnection with said blower means, and a dehumidifying system for said air positioned in advance of said main refrigeration means, said system comprising at least two refrigeration coils, damper means arranged to cover first one and then the other of said coils during defrosting thereof, and heating means on said damper means to prevent freezing of condensation after defrost of the covered of said coils, and means to operate said damper means to sequentially position said damper means over one and then the other of said refrigeration coils during alternate defrosting thereof.

10. In an open front refrigerator case, a series of adjacent cold air ducts arranged along the bottom, back and top of the case and adapted to discharge cold air layers of various degrees of temperature, said ducts directing said air downwardly to fall in a mass with the coldest air layer next to the interior face of the case and the progressive layers ranging in temperature, said ducts directing the warmest air layer furtherest from the exterior face of said case, and the exterior of said ducts being in contact with air at ambient temperature, and means in said case to cool said cold air layers.

11. In an open front refrigerator case, a series of cold air ducts disposed around the bottom, back and top of the case, said ducts being arranged to discharge cold air layers of various degrees of temperature, said ducts downwardly directing said layers, said ducts directing the coldest air layer next to the interior face of the case and progressive warmer layers outwardly from said case, the warmest air layer thereof being next to the exterior face of the case and in contact with air at ambient temperature, and an air mass entrapping duct located at the bottom of the case for removal of said layers, and means in said case to cool said cold air layers.

12. In an open front refrigerator case, a series of cold air ducts disposed around the bottom, back and top of the case, said ducts being arranged to discharge cold air layers of various degrees of temperature, said ducts discharging said air layers in a mass with the coldest air layer next to the interior face of the case and progressive layers ranging in higher temperature outwardly thereof, the outer of said ducts discharging the warmest air layer and being in contact with air at ambient temperature, an open duct located at the bottom of the case adapted to remove and discharge a portion of said air layers to a refrigerating unit, and means to recycle said air from said unit to said ducts at the top of said case.

13. In an open front refrigerator case, a series of cold air ducts around the exterior of the case adapted to discharge cold air curtains of various temperature gradients over the front of said case, said ducts directing said air to fall in a mass with the coldest air layer next to the interior face of the case and successive, higher temperature air layers exteriorly thereof, the outer of said ducts directing the warmest air layer exteriorly of the other of said ducts, a series of open ducts positioned at the bottom and generally parallel to the front of the case, said open ducts being positioned to entrap the coldest air in the duct next to the interior open face of the case, the successive of said open ducts being disposed to trap successively warmer layers of air, the outer of said open ducts being disposed to capture the warmest layer of air of the falling air mass, said cold air ducts extending around the exterior shell of the case, said outer duct being disposed in juxtaposition to the outer of the said open ducts for transporting the warmest air, the other of said ducts being disposed adjacent to each other whereby the air temperatures of the successive ducts graduate from the warmest air duct at the outer shell of the case to the coldest air duct located next to the inner shell of the case, and means for refrigerating and recycling said air through the cold air ducts located at the top of said case.

14. In an open front refrigerator cabinet having multiple display shelves therein, said shelves having cold air passageways therethrough terminating in downwardly extending spouts at the front thereof, means to force cold air through said passageways, said means including a vertical cold air duct behind said shelves and in interconnection therewith, multiple cool air ducts around said cabinet terminating in downwardly directed openings above said spouts, means to refrigerate and to recycle said cold air through said cold air duct, means to recycle said cool air through said multiple ducts, said refrigerating means including a dehumidifying means for air entering said cold air duct and said passageways, said last named means comprising at least two refrigerating coils for the collection of frost and to refrigerate said air, and means to defrost said coils alternately so as to render said dehumidifying operation continuous during operation of said refrigerating means.

15. In an open front refrigerated cabinet, an external cool air recycling system and an internal cold air cooling and recycling system, said internal system including a plurality of shelves having cold air passageways therethrough, said passageways terminating in downwardly directed openings near said open front, said external cool air recycling system comprising a plurality of ducts around said cabinet and exterior thereto, the outermost of said ducts being in contact with air at ambient temperature, said ducts terminating in downwardly directed discharge points positioned at the top of said open front, a refrigerating means for said cold air, dehumidifying means in the path of said recycled cold air, means to pick up air from said discharge points and said openings and recycle same to said dehumidifying means, said refrigeration means of said cold air system and to said ducts and said passageways.

16. In a refrigerated cabinet having an open front, an external cool air recycling system and an internal cold air cooling and recycling system, said internal system including a shelf having a cold air passageway therethrough, said passageway terminating in an opening within said cabinet, said external cool air recycling system comprising a plurality of exterior ducts around the bottom, back and top of said cabinet, the outermost of said ducts being in contact with air at near ambient temperature, said ducts terminating in discharge points at the top of said open front, a refrigerating means for said cold air, means to pick up air from said discharge points and said opening and recycle same to said ducts and said passageway, and dehumidifying means for recycled air to dehumidify said recycled air prior to entry into said refrigerating means.

17. In an open front refrigerator cabinet having at least one display shelf therein, said shelf having a cold air passageway therethrough terminating in a discharge opening, air distribution means to feed cold air through said passageway, means forming an air curtain across said open front of said cabinet, means to refrigerate and recycle said cold air through said distribution means and passageway in said shelf, dehumidifying means comprising at least two refrigerating coils for the removal of water vapor from said cold air prior to admission thereof to said refrigeration means, and means to completely isolate and defrost said coils alternately so as to render said dehumidifying operation continuous during operation of said refrigerating means.

18. In an open front refrigerated cabinet, an internal cold air cooling and recycling system and an air recycling means for cold air externally of said cabinet, said system including at least one shelf having a passageway therein, outlet means for discharging cold air from said passageway into said cabinet, said air recycling means including at least two adjacent ducts around said cabinet terminating in discharge openings at the top of said open front, the outer of said ducts discharging a wall of air in contact with air at ambient temperature, refrigerating means for said cabinet, and air return means at the bottom of said case to pick up air from said outlet means and said discharge openings and for recycling same to said shelf and said ducts, respectively.

19. In an upright refrigerator showcase having a display area with an open front, a series of hollow, vertically spaced shelves having discharge openings at the front thereof, said discharge openings being in approximate vertical alignment, a cold air duct behind and above said shelves and interconnected therewith, said duct having a discharge outlet above said discharge openings, means extending into said duct to proportion the amount of cold air feeding into each of said shelves, refrigerating means for said showcase, air return means in said showcase to pick up and recycle descending cold air from said discharge outlet and openings through said refrigerating means, said duct and said shelves, and passageway means surrounding said display area and terminating in downwardly directed cool air delivery means at the top and front of said showcase, said passageway means being arranged to direct a multiple air curtain of substantial depth across said open front of said display area in front of said descending cold air, and means for recycling air curtain air through said passageway means.

20. In a refrigerator system for an open front showcase, means to recycle air at the bottom and front of said showcase comprising an air inlet at said bottom and front and blower means in interconnection therewith, main refrigeration means in interconnection with said blower means, and a dehumidifying system for said air positioned in advance of said main refrigeration means, said system comprising two refrigeration coils, means for isolating each of said coils from said main refrigeration means during predetermined operative periods of said main refrigeration means, heating means for defrosting said coils and means for supplying heat to said coil isolating means to maintain said last named means in operative condition.

21. In a refrigerator system for an open type showcase, means to recycle air at the bottom and front of said case comprising an air inlet at said bottom and front and blower means in interconnection therewith, main refrigeration means in interconnection with blower means, and a dehumidifying system for said air positioned in advance of said main refrigeration means, said system comprising at least two dehumidifying coils, and pivoted damper means arranged to pivot to cover first one and then the other of said coils during defrosting thereof and having an intermediate position for air flow through both of said coils during non-defrosting periods thereof.

22. In a refrigerator system for a showcase having a display area with an open front, means to discharge cold air into said display area and in metered streams down said open front to cool said display area, means forming an air curtain of substantial depth across said open front, said curtain having progressively warmer air outwardly of said display area in front of said metered streams, means to recycle the air of said metered streams at the bottom and front of said showcase comprising an air inlet at said bottom and front and blower means in interconnection therewith, main refrigeration means in interconnection with said blower means, and a dehumidifying system for said air positioned in advance of said main refrigeration means, said system comprising at least two refrigeration coils, damper means arranged to cover first one and then the other of said coils during defrosting thereof and having an intermediate position for air flow through both of said coils during non-defrosting periods thereof, means for preventing freezing of said damper means after the defrost period of each of said coils, and means to operate said damper means to sequentially position said damper means over one refrigeration coil, intermediate both coils and spaced therefrom, and then over the other refrigeration coil.

23. In a refrigerated case having a display area with an open front, an external cool air recycling system and an internal cold air cooling and recycling system, said internal system including a plurality of shelves in said display area and having cold air passageways therethrough, said passageways terminating in discharge openings near said open front, said external cool air recycling system comprising at least two ducts around said display area and exterior thereto, the outermost of said ducts defining the exterior wall of said case, said ducts terminating in downwardly directed discharge points positioned at the top of said open front, refrigerating means for said cold air, dehumidifying means in the path of said recycled cold air, means to pick up air from said discharge openings and recycle same to said dehumidifying means, said refrigeration means of said cold air system and to said passageways.

24. In a refrigerator cabinet including a refrigerated product display area having an upright open side, means to feed refrigerated air in metered streams to said product display area, means to pass a plurality of said streams downwardly along said open side, refrigeration means for cooling said streams, means to remove said streams at the bottom of said product display area and recycle said streams through said refrigeration means and said product display area, means to pass additional cool air in a series of layers around said product display area and from the top thereof downwardly, said last named means directing said cool air along the outside of said metered streams to protect said metered streams from warmer, external air, and dehumidifying means to continuously remove water vapor from said metered streams prior to admission to said refrigeration means.

25. In a refrigerator cabinet including a refrigerated product display area having an upright open side, means to feed refrigerated air in metered streams to said display area, means to uniformly disperse said streams throughout said product display area, means to pass a plurality of said streams downwardly along said open side, refrigeration means for cooling said streams, means to remove said streams at the bottom of said display area and recycle said streams through said refrigeration means and product display area, duct means to pass additional cool air in a series of streams around the bottom, back and top of said product display area in heat exchange relationship therewith, said duct means having a discharge opening to direct said additional cool air downwardly from the top of said product display area across said open front adjacent to and on the outside of said metered streams whereby said metered streams are protected from the turbulence, humidity and higher temperature of air external to said product display area, and means to continuously dehumidify said metered streams prior to admission to said refrigeration means.

References Cited in the file of this patent
UNITED STATES PATENTS

| | | |
|---|---|---|
| 1,711,691 | Richter | May 7, 1929 |
| 2,254,420 | Cleveland | Sept. 2, 1941 |
| 2,836,039 | Weber | May 27, 1958 |